United States Patent [19]

Miese et al.

[11] Patent Number: 5,338,174
[45] Date of Patent: Aug. 16, 1994

[54] DISPLACEMENT AND/OR ACTUATING FORCE DRIVE DEVICE FOR AN INJECTION MOLDING MACHINE

[75] Inventors: Manfred Miese, Ettlingen; Johann Holzschuh, Meinerzhagen, both of Fed. Rep. of Germany

[73] Assignee: Battenfeld GmbH, Meinerzhagen, Fed. Rep. of Germany

[21] Appl. No.: 867,165

[22] Filed: Apr. 10, 1992

[30] Foreign Application Priority Data

Apr. 10, 1991 [DE] Fed. Rep. of Germany ....... 4111594

[51] Int. Cl.$^5$ ............................................. B29C 45/80
[52] U.S. Cl. .................. 425/150; 425/450.1; 425/451.9; 425/589
[58] Field of Search .............. 425/145, 150, 589, 595, 425/450.1, 451.9

[56] References Cited

U.S. PATENT DOCUMENTS

| | | | |
|---|---|---|---|
| 3,156,014 | 11/1964 | Wenger | 425/589 |
| 3,856,454 | 12/1974 | Aoki | 425/595 |
| 4,988,273 | 1/1991 | Faig et al. | 425/589 |

FOREIGN PATENT DOCUMENTS

| | | |
|---|---|---|
| 3505880 | 8/1985 | Fed. Rep. of Germany . |
| 404189 | 12/1965 | Switzerland . |

Primary Examiner—Tim Heitbrink
Attorney, Agent, or Firm—Akoo-Toren

[57] ABSTRACT

A displacement and/or actuating force drive device for an injection molding machine, for example, for actuation of the push-type screw of a plasticizing extruder or the closing unit of an injection mold, comprises generally a hydraulic stroke drive, in tandem in rows or in series with a mechanical stroke spindle system driven by a brushless three-phase servomotor type electromotor. The motor is associated with a positioning regulation device dependent upon the closing and opening position of the injection mold. The hydraulic stroke drive can be actuated from a pressure regulation circuit by a servo valve. The circuit depends upon the closing force between the two mold halves of the injection mold.

5 Claims, 2 Drawing Sheets

DISPLACEMENT AND/OR ACTUATING FORCE DRIVE DEVICE FOR AN INJECTION MOLDING MACHINE

FIELD OF THE INVENTION

The present invention is directed to injection molding machines and more particularly to a displacement and/or actuating force drive device for actuating, for example, a pusher-screw of an extruder of a closing unit of an injection molding machine.

BACKGROUND OF THE INVENTION

It is often necessary to perform actuation movements and to generate force effects at different times or consecutively in injection molding machines. The actuation movements occur over more or less large displacements if little or no displacements are to be overcome when force effects are applied. The varying requirements occur in the operation of injection molding machines in connection with, for example, a pusher type screw unit of extruders wherein the plasticized plastics melt is metered into an injection mold by displacing the pusher type screw and the melt is subsequently subjected to a so-called dwell pressure.

Similar varying requirements also arise when operating a closing unit of an injection mold where two mold halves are movable towards or away from each other for the respective closing and opening of the injection mold, wherein the injection mold must be subjected to a specific closing force in its closed position.

It is therefore an object of the present invention to optimize the operating mode of a true-to-type displacement and/or actuating force driving device for injection molding machines.

A further object of the invention is to provide an economical displacement and/or actuating force drive device for injection molding machines.

Another object of the invention is to provide a device whose electromechanical displacement drive apparatus overcomes relatively larger actuation travels rapidly and safely.

Yet another object of the invention is to provide a device whose electromagnetic displacement drive device provides the necessary dwell pressure and/or closing forces.

SUMMARY OF THE INVENTION

These and other objects of the invention, which shall become hereafter apparent, are achieved by the Displacement and/or Actuating Force Drive Device for Injection Molding Machines comprising a hydraulic stroke drive in tandem in rows or in series with a mechanical stroke spindle system driven by an electromotor.

The device uses a hybrid system whose electromechanical displacement drive device overcomes relatively large actuation travels rapidly and safely and whose actuation force provides the necessary dwell pressures and/or closing forces. The hydraulic stroke drive, which comprises a double-acting cylinder unit is controllable by at least one servo valve and one pressure regulation circuit so that the forces generated thereby are accurately determined and are able to be varied in a continuous or stepless manner. The hydraulic stroke drive is housed in a yoke movable along a straight line by the stroke spindle system and comprises a relatively short stroke piston cylinder unit.

The yoke has a movable mold clamping plate and contains a cylinder of a piston cylinder unit. The spindle of the stroke spindle system engages at the piston of the piston cylinder unit. The yoke can however have an intermediate link between a push type screw of an extruder and a spindle of a stroke spindle system and can contain the cylinder of a piston cylinder unit, wherein the spindle engages, for example, at the yoke while the piston is coupled with the push-type screw of the extruder.

The device uses a brushless three-phase servomotor type electromotor to which a positioning regulator is to be assigned to assure that the preset actuation travels are always exactly covered.

BRIEF DESCRIPTION OF THE DRAWINGS

The invention will be better understood in view of the detailed description of the preferred embodiments, in connection with the drawings of which.

DETAILED DESCRIPTION OF THE PREFERRED EMBODIMENTS

Figure 1:
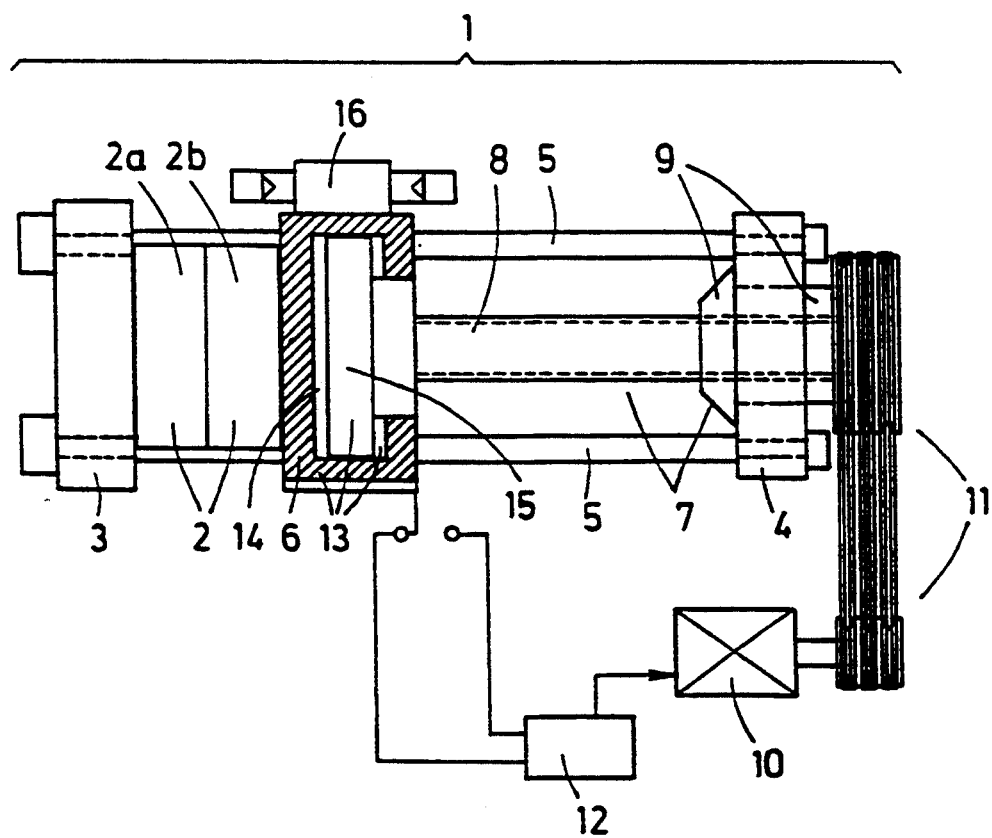
FIG. 1 is a cross-sectional schematic view of a closing unit of an injection molding machine with its displacement and/or actuating force driving apparatus.

Reviewing now the drawings, FIG. 1 depicts, in schematic, cross-sectional fashion, a closing unit 1 for an injection mold 2 used, for instance, in injection mold machines or installed in the region of the same. The unit 1 comprises parallel guide beams 5 extending between two end plates 3, 4. Yoke 6 is displaceably held and aligned between the two end plates 3, 4.

End plate 3 forms a stationary clamping plate for one half 2a of the injection mold 2, while yoke 6 acts as a mobile clamping plate for the other half 2b of the injection mold 2. The injection mold 2 can be opened and closed by displacing yoke 6 on the guide beams 5 of the closing unit 1 relative to the end plate 3. The relative movement will cause the two halves 2a and 2b of the injection mold to correspondingly move apart or together.

The yoke 6 is displaced along the guide beams 5 of the closing unit 1 by a stroke spindle system 7 comprising a threaded spindle 8 which engages the yoke 6 and a spindle nut 9 rotatably supported in end plate 4. The rotary driving of the spindle nut 9 is facilitated by, preferably, a brushless three-phase servomotor type electromotor 10 and a transmission belt 11. The electromotor 10 is preferably acted upon by a positioning regulator 12 which responds to the different positions of the yoke 6 relative to the end plate 3 or to the opening and closing of the two mold halves 2a and 2b of the injection mold in order to enable a precise and economical operation of the closing unit 1.

A hydraulic stroke drive 13 is in a tandem row or series arrangement with respect to the stroke spindle system 7 and preferably comprises a double-acting relatively short stroke piston-cylinder unit. The cylinder 14 of the hydraulic stroke drive 13 is housed in the yoke 6 or in the mobile mold clamping plate of the closing unit 1, while the piston 15 engages the threaded spindle 8 of the stroker piston system 7.

A servo valve 16 located in a pressure regulation circuit actuates the hydraulic stroke drive 13. The valve is affected by the respective closing pressure between the two halves 2a and 2b of the injection mold 2. The closing force of the closing unit 1 can be accurately adjusted in a stepless or continuous manner, according to the respective requirements, by the servo valve 16 as well as by the hydraulic stroke drive 13 after the injection mold 2 has been brought into its closed position by the stroke spindle system 7.

Figure 2:
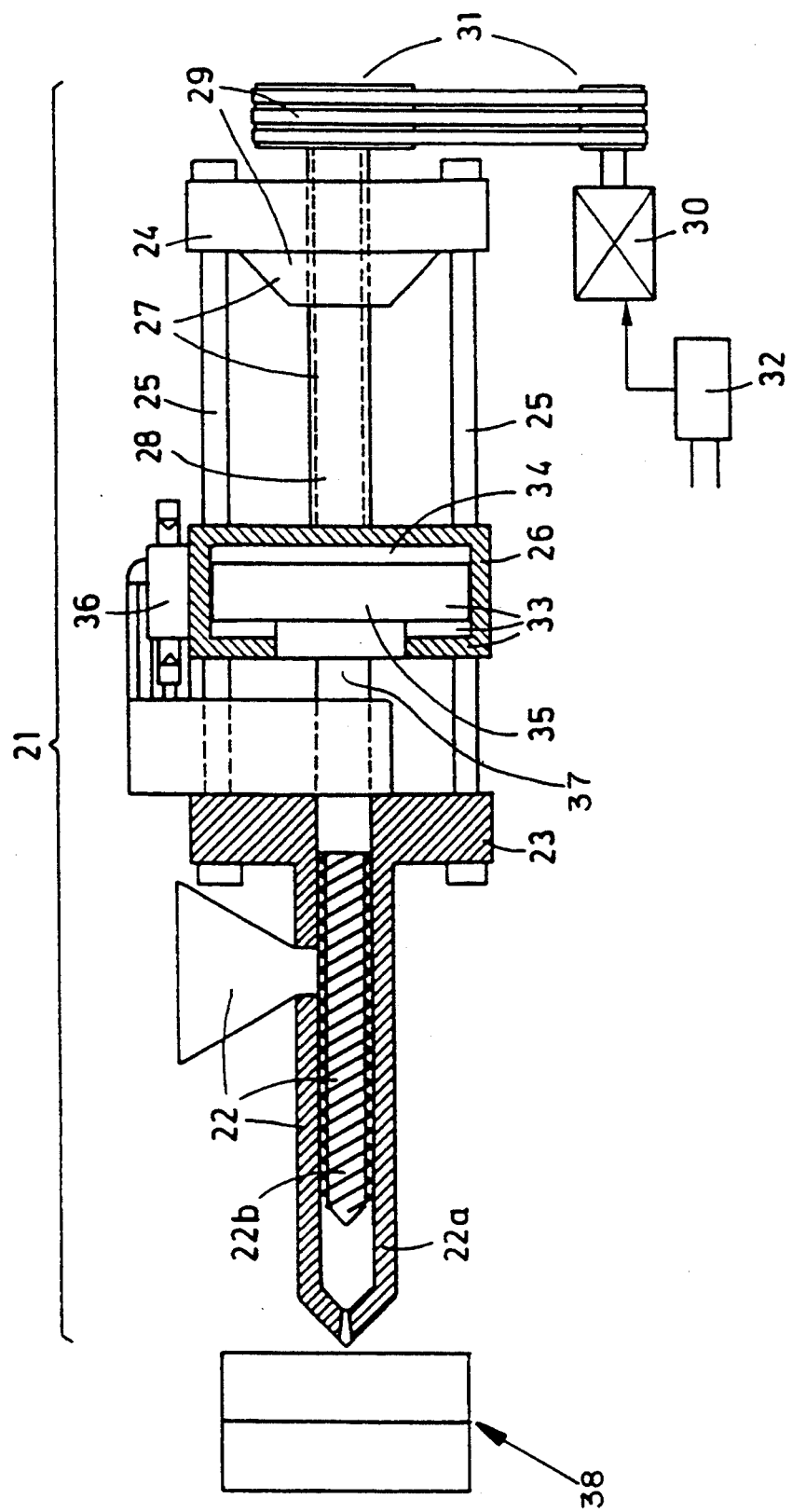
FIG. 2 is a push-type screw unit of an extruder with its associated displacement and/or actuating force driving apparatus.

FIG. 2 depicts the basic structure of the displacement and/or drive apparatus shown in FIG. 1, without any essential change for the operation of the push-type screw unit 21 of a plasticizing extruder 22. The plasticizing extruder 22 comprises a screw cylinder 22a and a rotatable and displaceable push-type screw 22b.

The device of FIG. 2 also has several parallel guide beams 25, two end plates 23, 24 and a displaceable yoke 26. The yoke 26 is movable along the guide beams 25 by a stroke spindle system 27 which comprises one or more threaded spindles 28 engaging the yoke 26 and one or more spindle nuts 29, rotatably driven by a brushless three-phase servomotor type electromotor 30 and transmission belt 31. The electromotor 30 can be affected by a position regulator 32 which, again, depends upon the displacement position of the yoke 26.

The hydraulic stroke drive 33 comprises a piston cylinder unit 34 integrated into the yoke 26. Piston 35 engages, at the rear end of the push-type screw 22b by means of a piston rod 37. The double-acting piston cylinder unit of the hydraulic stroke drive 33 can be controlled by a servo valve 36 located in a pressure regulation circuit. The valve is affected by the internal pressure in an injection mold 38, if its mold cavity has been charged with a plastics melt by the plasticizing extruder 22.

For charging or filling the injection mold 38 with plasticized plastics melt, only the stroke spindle system 27 is actuated. The push-type screw 22b is then pushed forwarded in the screw cylinder 22a by the yoke 26. Only after the mold cavity of the injection mold 38 has filled with the thermoplastic plastics melt is the hydraulic stroke drive 33 acted upon to affect the push-type screw 22b through the piston 35 and the piston rod 37 so that the so-called dwell pressure is applied to the plastics melt inside the injection mold 38.

While the preferred and alternate embodiments of the invention have described in detail, various modifications and adaptations thereof may be made without departing from the spirit and scope of the invention as delineated in the following claims:

What is claimed is:

1. A drive device for an injection molding machine for actuating a closing unit of said injection molding machine, said drive device comprising:
   a hydraulic stroke unit comprising a short stroke piston-cylinder unit;
   a mechanical stroke spindle system arranged in tandem with said hydraulic stroke unit;
   an electromotor for driving said stroke spindle system;
   a yoke displaceable along a straight line by said spindle stroke system and acted upon by said hydraulic stroke unit which is located inside said yoke;
   a position regulator for controlling operation of said electromotor in accordance with a position of said yoke along said straight line; and
   a servo valve of a pressure regulation circuit for controlling said hydraulic stroke unit in accordance with a closing pressure between halves of the injection mold.

2. A drive device according to claim 1, herein said piston-cylinder unit is a double-acting piston-cylinder unit.

3. A drive device according to claim 1, wherein said electromotor is a brushless three-phase servomotor.

4. A drive device according to claim 1, wherein said yoke forms a mobile mold clamping plate of the closing unit and defines the cylinder of said piston-cylinder unit.

5. A drive device according to claim 4, wherein said stroke spindle system acts on the piston of said piston-cylinder unit.

* * * * *